United States Patent
Fiske et al.

(10) Patent No.: US 9,798,734 B2
(45) Date of Patent: *Oct. 24, 2017

(54) PRESERVING REDUNDANCY IN DATA DEDUPLICATION SYSTEMS BY INDICATOR

(71) Applicant: INTERNATIONAL BUSINESS MACHINES CORPORATION, Armonk, NY (US)

(72) Inventors: Rahul M. Fiske, Pune (IN); Carl E. Jones, Tucson, AZ (US); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,293

(22) Filed: Mar. 1, 2013

(65) Prior Publication Data

US 2013/0282673 A1    Oct. 24, 2013

Related U.S. Application Data

(63) Continuation of application No. 13/453,252, filed on Apr. 23, 2012.

(51) Int. Cl.
*G06F 17/30* (2006.01)
*G06F 3/06* (2006.01)

(52) U.S. Cl.
CPC ...... *G06F 17/30156* (2013.01); *G06F 3/0608* (2013.01); *G06F 3/0619* (2013.01);
(Continued)

(58) Field of Classification Search
CPC ..................... G06F 17/3015; G06F 17/30156
See application file for complete search history.

(56) References Cited

U.S. PATENT DOCUMENTS 7,567,188 B1 *  7/2009  Anglin et al. .................. 341/63
7,818,495 B2 * 10/2010  Tanaka et al. ................ 711/103
(Continued)

FOREIGN PATENT DOCUMENTS

CN        1341240 A    3/2002
CN      101656720 A    2/2010
(Continued)

OTHER PUBLICATIONS

Wang et al., "Research on Secure De-duplication based on Proxy-Recreation," Sciencepaper Online, Dec. 27, 2011 (7 pages).
(Continued)

*Primary Examiner* — James Trujillo
*Assistant Examiner* — Hubert Cheung
(74) *Attorney, Agent, or Firm* — Griffiths & Seaton PLLC

(57) ABSTRACT

Various embodiments for preserving data redundancy in a data deduplication system in a computing environment are provided. In one embodiment, a method for such preservation is disclosed. An indicator is configured. The indicator is provided with a selected data segment to be written through the data deduplication system to designate that the selected data segment must not be subject to a deduplication operation, such that repetitive data can be written and stored on physical locations despite being identical.

4 Claims, 5 Drawing Sheets

(52) U.S. Cl.
CPC .......... *G06F 3/0641* (2013.01); *G06F 3/0659* (2013.01); *G06F 3/0689* (2013.01)

(56) References Cited

U.S. PATENT DOCUMENTS

| | | | |
|---|---|---|---|
| 7,908,436 B1 | 3/2011 | Srinivasan et al. | |
| 8,074,049 B2 | 12/2011 | Gelson et al. | |
| 8,086,799 B2 | 12/2011 | Mondal et al. | |
| 8,117,464 B1 | 2/2012 | Kogelnik | |
| 8,468,138 B1* | 6/2013 | Chhaunker et al. | 707/654 |
| 8,527,544 B1* | 9/2013 | Colgrove et al. | 707/791 |
| 8,539,148 B1 | 9/2013 | Chen et al. | |
| 8,589,640 B2* | 11/2013 | Colgrove et al. | 711/156 |
| 8,660,994 B2 | 2/2014 | Slater et al. | |
| 8,712,976 B1* | 4/2014 | Chen | G06F 17/30156 |
| | | | 707/692 |
| 9,058,118 B1 | 6/2015 | Urkude et al. | |
| 2003/0115447 A1 | 6/2003 | Pham et al. | |
| 2003/0225800 A1 | 12/2003 | Kavuri | |
| 2004/0111625 A1 | 6/2004 | Duffy et al. | |
| 2004/0131182 A1 | 7/2004 | Rogaway | |
| 2006/0179489 A1 | 8/2006 | Mas Ribes | |
| 2006/0230076 A1 | 10/2006 | Gounares et al. | |
| 2007/0168350 A1 | 7/2007 | Utiger | |
| 2008/0098083 A1 | 4/2008 | Shergill et al. | |
| 2008/0244172 A1* | 10/2008 | Kano | 711/112 |
| 2009/0063795 A1 | 3/2009 | Yueh | |
| 2009/0063883 A1 | 3/2009 | Mori | |
| 2009/0268903 A1 | 10/2009 | Bojinov et al. | |
| 2009/0271402 A1 | 10/2009 | Srinivasan et al. | |
| 2009/0319585 A1 | 12/2009 | Gokhale | |
| 2009/0319772 A1 | 12/2009 | Singh et al. | |
| 2010/0037118 A1 | 2/2010 | Saliba et al. | |
| 2010/0070478 A1 | 3/2010 | Anglin | |
| 2010/0070715 A1 | 3/2010 | Waltermann et al. | |
| 2010/0121825 A1* | 5/2010 | Bates | G06F 17/30156 |
| | | | 707/692 |
| 2010/0250501 A1 | 9/2010 | Mandagere et al. | |
| 2010/0250549 A1 | 9/2010 | Muller | |
| 2010/0268960 A1 | 10/2010 | Moffat et al. | |
| 2010/0299311 A1 | 11/2010 | Anglin et al. | |
| 2010/0306412 A1 | 12/2010 | Therrien et al. | |
| 2010/0313036 A1 | 12/2010 | Lumb | |
| 2010/0313040 A1 | 12/2010 | Lumb | |
| 2010/0333116 A1 | 12/2010 | Prahlad et al. | |
| 2011/0022718 A1 | 1/2011 | Evans et al. | |
| 2011/0029739 A1* | 2/2011 | Nakajima et al. | 711/154 |
| 2011/0035541 A1 | 2/2011 | Tanaka et al. | |
| 2011/0066628 A1 | 3/2011 | Jayaraman | |
| 2011/0145207 A1* | 6/2011 | Agrawal et al. | 707/692 |
| 2011/0145576 A1 | 6/2011 | Bettan | |
| 2011/0225130 A1 | 9/2011 | Tokoro | |
| 2011/0225214 A1* | 9/2011 | Guo | 707/813 |
| 2011/0238634 A1 | 9/2011 | Kobara | |
| 2011/0238635 A1 | 9/2011 | Leppard | |
| 2011/0239097 A1 | 9/2011 | Bates et al. | |
| 2011/0258398 A1 | 10/2011 | Saliba et al. | |
| 2012/0017043 A1 | 1/2012 | Aizman et al. | |
| 2012/0072654 A1* | 3/2012 | Olbrich et al. | 711/103 |
| 2012/0089574 A1* | 4/2012 | Doerner | 707/654 |
| 2012/0095968 A1 | 4/2012 | Gold | |
| 2012/0158672 A1 | 6/2012 | Oltean et al. | |
| 2012/0317084 A1* | 12/2012 | Liu | 707/692 |
| 2013/0086006 A1* | 4/2013 | Colgrove et al. | 707/692 |
| 2013/0097380 A1* | 4/2013 | Colgrove et al. | 711/118 |
| 2013/0144846 A1* | 6/2013 | Chhaunker et al. | 707/692 |
| 2013/0198742 A1 | 8/2013 | Kumar et al. | |
| 2013/0262404 A1* | 10/2013 | Daga et al. | 707/692 |
| 2013/0262753 A1* | 10/2013 | Prins et al. | 711/103 |

FOREIGN PATENT DOCUMENTS

| | | |
|---|---|---|
| CN | 201110156839 A | 6/2011 |
| CN | 102156727 A | 8/2011 |
| CN | 102221982 A | 10/2011 |
| CN | 102281320 A | 12/2011 |
| JP | 2006308636 A | 11/2006 |
| WO | 2011033582 A1 | 3/2011 |

OTHER PUBLICATIONS

Gu Yu et al., "Reliability Provision Mechanism for Large-Scale De-duplication Storage Systems," J Tsinghua Univ (Sci & Tech), ISSN 1000-0054, vol. 50, No. 5, 2010 (6 pages).

* cited by examiner

| Byte/Bit | 7 | 6 | 5 | 4 | 3 | 2 | 1 | 0 |
|---|---|---|---|---|---|---|---|---|
| 0 | Operation Code (C0h) ||||||||
| 1 | Reserved ||| DPO | Reserved | EBP | ByteChk | RelAddr |
| 2 | Logical Block Address ||||||||
| 9 | |||||||| 
| 10 | Transfer Length ||||||||
| 13 | ||||||||
| 14 | Reserved ||||||||
| 15 | ||||||||
| 16 | RelativeChk ||||||||
| 17 | Time ||||||||
| 24 | ||||||||
| 25 | Reserved ||||||||
| 30 | ||||||||
| 31 | Control ||||||||

FIG. 3

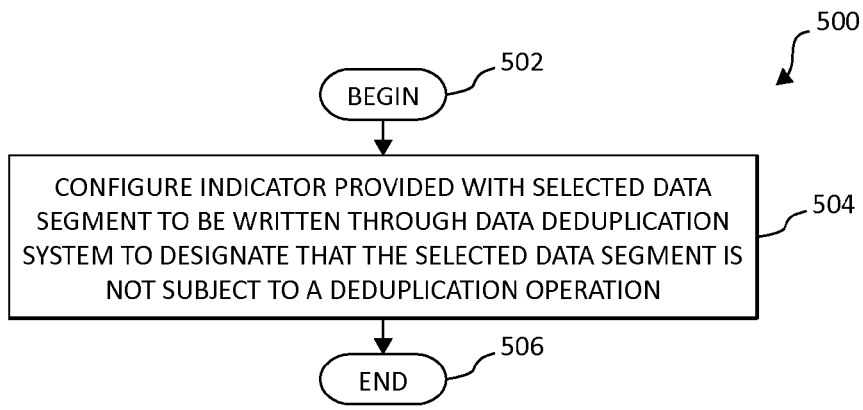
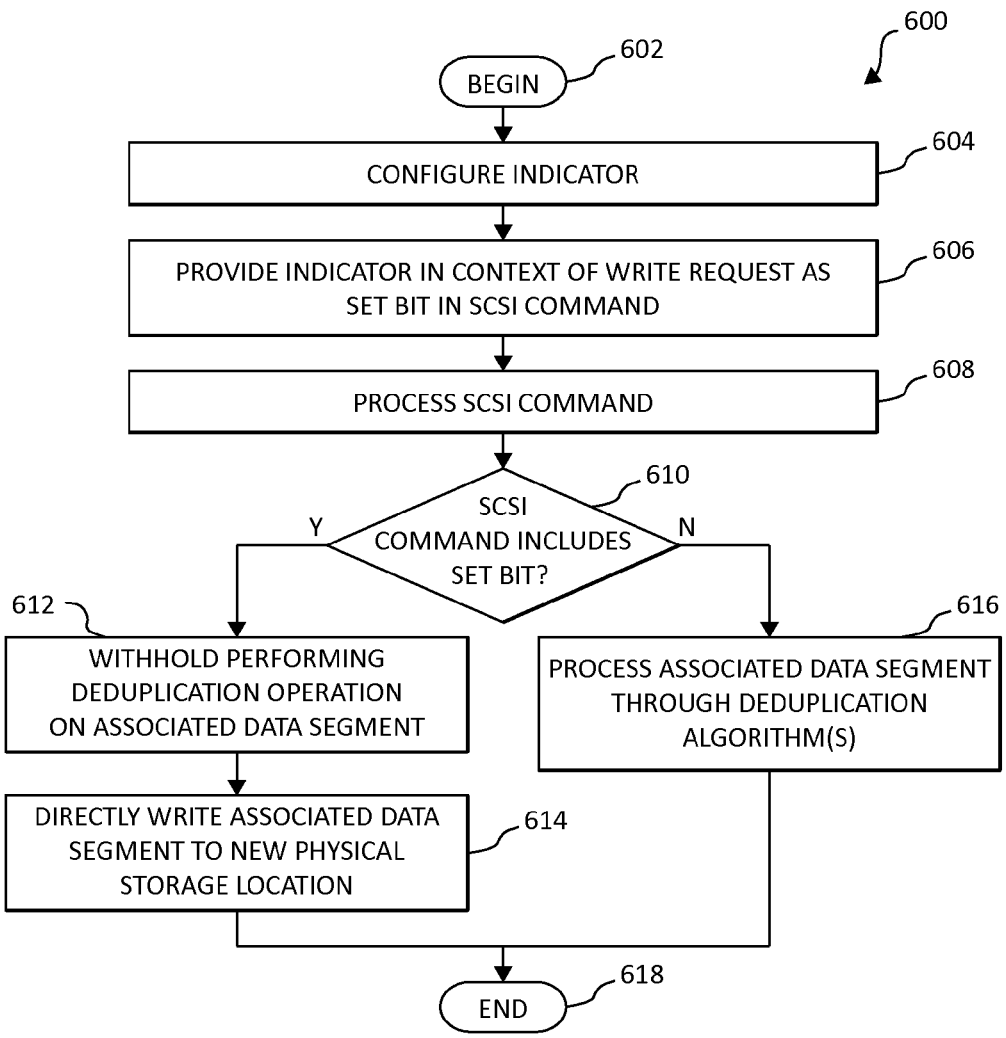

PRESERVING REDUNDANCY IN DATA DEDUPLICATION SYSTEMS BY INDICATOR

CROSS REFERENCE TO RELATED APPLICATIONS

This application is a Continuation of U.S. patent application Ser. No. 13/453,252, filed on Apr. 23, 2012.

FIELD OF THE INVENTION

The present invention relates in general to computers, and more particularly to a method, system, and computer program product for preserving redundancy and other data security characteristics in computing environments in which data deduplication systems are incorporated.

DESCRIPTION OF THE RELATED ART

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE INVENTION

Many multi-tiered/multi-system computing environments implement data deduplication technologies to improve storage performance by reducing the amount of duplicated storage across storage devices. Data deduplication systems are increasingly utilized because they help reduce the total amount of physical storage that is required to store data. This reduction is accomplished by ensuring that duplicate data is not stored multiple times. Instead, for example, if a chunk of incoming application WRITE data matches with an already stored chunk of data, a pointer to the original data is stored in the virtual storage map instead of allocating new physical storage space for the new chunk of data.

In certain situations, however, the behavior of deduplication i.e. single instancing of duplicate data, may go against the redundancy requirements of a hosted application, for example, or a storage policy, or other requirements. A need exists for a mechanism whereby data having the need to be stored multiple times is safeguarded, yet the benefits of deduplication systems are not diminished, by allowing deduplication to occur for remaining data not having such requirements.

In view of the foregoing, various embodiments for preserving data redundancy in data deduplication systems are disclosed. In one embodiment, by way of example only, a method for such preservation is disclosed. An indicator is configured. The indicator is provided with a selected data segment to be written through the data deduplication system to designate that the selected data segment must not be subject to a deduplication operation.

In addition to the foregoing exemplary embodiment, various system and computer program embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is an exemplary write request, in which aspects of the present invention may be implemented;

FIG. 5 is an exemplary method for ensuring redundancy in data deduplication systems according to the present invention; and FIG. 6 is an exemplary method for processing data in which aspects of the present invention may be implemented.

DETAILED DESCRIPTION OF THE DRAWINGS

Figure 1:
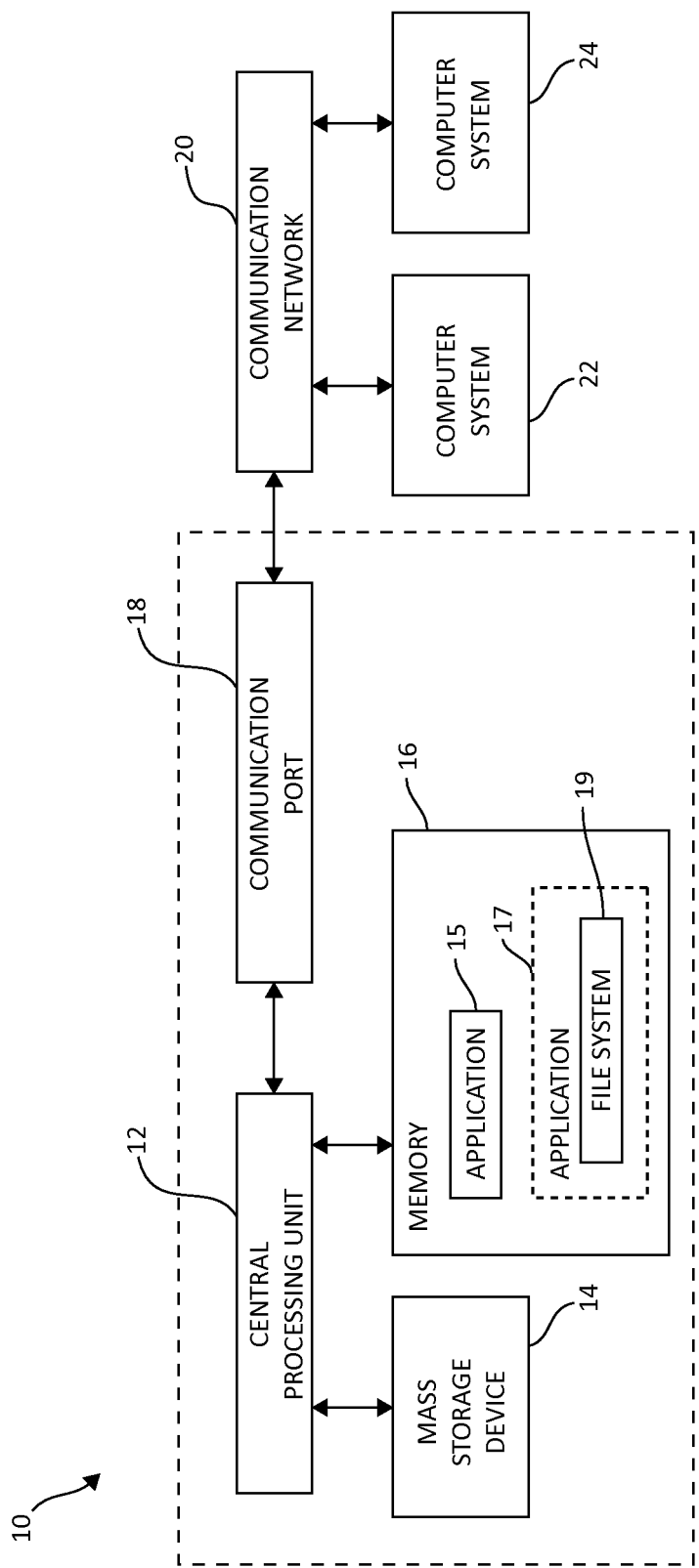
FIG. 1 is a block diagram illustrating an exemplary computing environment which may implement aspects of the present invention.

Data deduplication in storage controllers typically works "behind the scene" of an application, and may sometimes operate contrary to the interests of the application when deduplication operations are performed against the needs of the application. This situation may arise if an application writes multiple copies of the same data, and intends to retain multiple physical copies, while the deduplication subsystem (deduplication engine) finds these matching copies and ends up deduplicating the copies while storing the data. This can be detrimental to the application, which expects to find multiple copies at various locations, and is made to believe that it has done so by the storage subsystem, but in reality only a single copy of the data has been written.

Consider the following example. File systems usually prefer to write multiple physical copies of the "Superblock," or a segment of metadata describing the file system on a block-based storage device, (or other metadata information) on a virtual disk to ensure redundancy. Since the contents of the Superblock are the same, data deduplication would result in retaining a single, physical copy of the Superblock and point multiple virtual addresses to the same physical block. This situation is highly inadvisable, because the loss of a single block on the physical copy of the Superblock may render the file system totally unusable, as there are no redundant copies of the Superblock. Conventionally, there are no existing methodologies that directly address this problem in data deduplication systems.

Various indirect methodologies may be employed to attempt to address this problem. In one example, the storage pool from which the data deduplication subsystem carves out physical storage can be mirrored (i.e., contains 2 or 3 copies of the same data). Hence multiple redundant copies can be created despite deduplication. However, this is inadequate protection for the application because of the following reasons. First, the application may wish to keep, for example, ten (10) copies of the same data. However, if the storage pool is two-way mirrored, it may only retain a maximum of two (2) copies. Second, since data deduplication carves out physical storage pools that span across large amounts of storage and multiple file systems, it is likely that multiple applications and file systems share the same physical storage pool. Hence it is possible that some critical copies of data (like the Superblock) get physically placed on the same disk. Since deduplication would prevent multiple copies of the same data to be written to multiple physical locations, the number of copies of critical data reduces and they can get placed on the same physical disk for multiple file systems. This increases the risk of single failures becoming fatal.

The illustrated embodiments provide multiple mechanisms for addressing the issues discussed previously. One goal of these mechanisms is to ensure that the deduplication subsystem in the storage controller (or wherever it may be located) balances the benefits of reducing the number of copies of data against application requirements for physical allocating multiple copies of critical data. Each of the methodologies described in the following illustrated embodiments may be used in a variety of circumstances and may have attendant benefits specific to those circumstances.

In one such embodiment, an indicator may be provided by the application for a selected data segment to the target storage controller to designate that the particular data segment is not subject to deduplication operations. This action then forces the storage controller to allocate new, physical storage for the specified data blocks. One such indicator may include a bit, which is set high or low depending on whether the desired deduplication should be performed for the selected data segment/block.

In view of the described embodiment, by allowing the application to dictate whether a write must be deduplicated, the application is allowed flexibility to implement storage policy associated with the data it generates. This way, the application is in a better position than the deduplication system to determine whether selected data blocks, even though identical, must still be located in separate physical locations. In addition, the storage controller (or other storage management device) continues to perform its role of data reduction by deduplication, and at the same time allowed enough control to the application to rule out deduplication when required.

By providing write commands with an indicator to indicate to the storage controller (or again, other storage management devices) whether the selected data must skip deduplication, very fine-grained control is thereby provided to the application, allowing for flexibility in implementation while still retaining advantages of deduplication functionality and retaining redundancy for key data.

In the following description, reference is made to the accompanying drawings which form a part hereof and which illustrate several embodiments of the present invention. It is understood that other embodiments may be utilized and structural and operational changes may be made without departing from the scope of the present invention.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). The data management operations, in which aspects of the present invention may be implemented as further described, may be executed on device(s) 14, located in system 10 or elsewhere. Memory device 16 may include such memory as electrically erasable programmable read only memory (EEPROM) or a host of related devices.

Memory 16 is shown including an application program 15, and an application program 17, in which a file system 19 is operational. Application 15 and application 17 may create, delete, or otherwise manage segments of data, such as data chunks or data blocks, which are physically stored in devices such as mass storage device 14. File system 19 provides a means to organize data expected to be retained after the application program 17 terminates by providing procedures to store, retrieve, and update data, as well as manage the available space on the device(s) that contain it. The file system 19 organizes data in an efficient manner, and is tuned to the specific characteristics of the device (such as computer 10 and/or memory 16). In one embodiment, application 17 may be an operating system (OS) 17, and file system 19 retains a tight coupling between the OS 17 and the file system 19. File system 19 may provide mechanisms to control access to the data and metadata, and may contain mechanisms to ensure data reliability such as those necessary to further certain aspects of the present invention, as one of ordinary skill in the art will appreciate. File system 19 may provide a means for multiple application programs 15, 17 to update data in the same file at nearly the same time.

In the illustrated embodiment, memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform each operation described herein to accomplish the purposes of the present invention.

Figure 2:
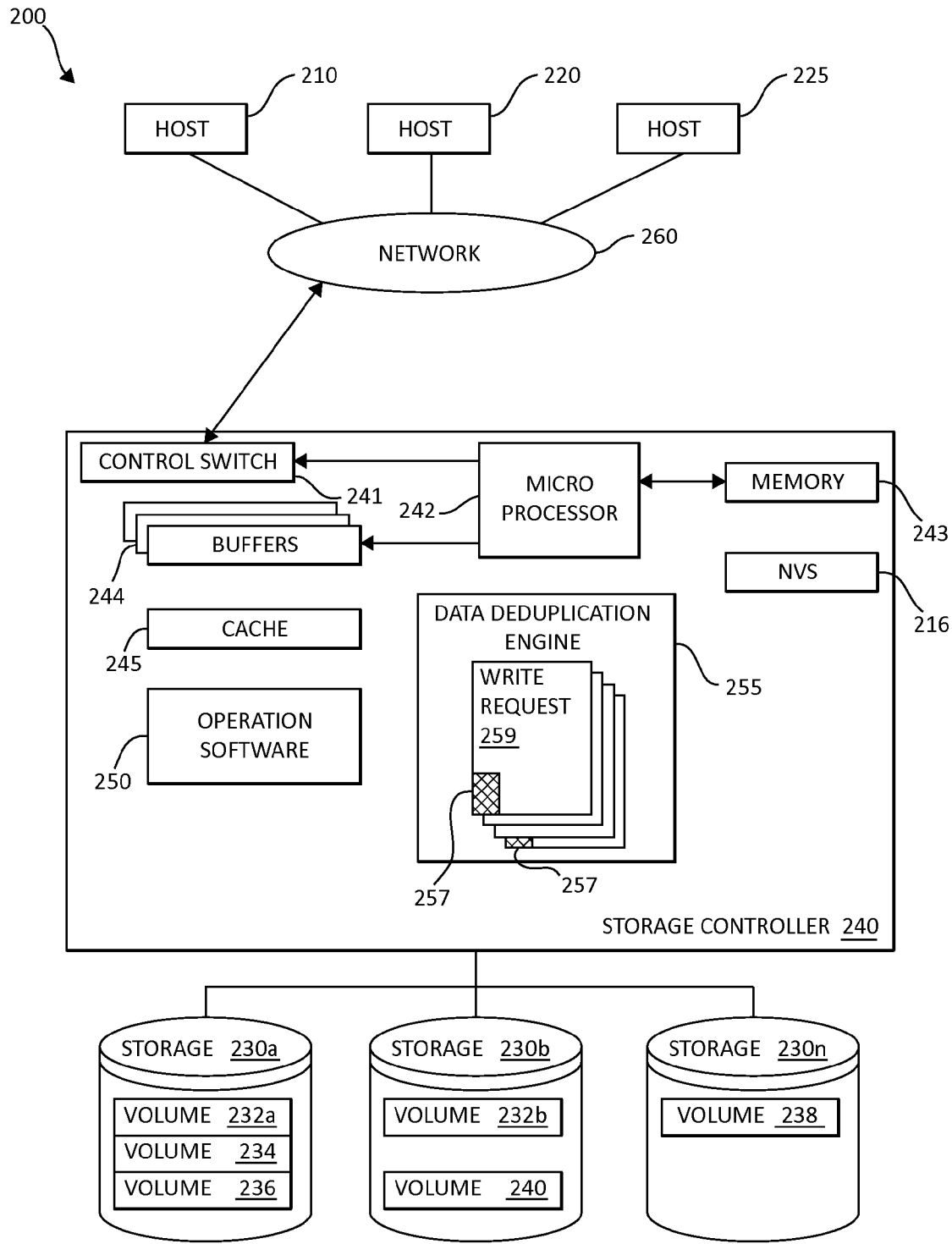
FIG. 2 is a block diagram showing a hardware structure of a data storage system, again in which aspects of the present invention may be implemented.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data that the processor 242 may access for executing functions associated with managing storage 230. In one embodiment, system memory 243 includes, is associated, or is in communication with the operation software 250, and configured in part for accomplishing functionality of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control and each table described later, cache 245 for temporarily storing (buffering) data, and buffers 244 for assisting the cache 245 to read and write data, a control switch 241 for controlling a protocol to control data transfer to or from the storage devices 230, and compression operation module 255 and compression operation list module 257 in which information may be set. Multiple buffers 244 may be implemented with the present invention to assist with the operations as described herein.

In one embodiment, the host computers or one or more physical or virtual devices, 210, 220, 225 and the storage controller 240 are connected through a network adaptor (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, compression operation module 255 and compression operation list module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

The storage controller 240 is shown including a data deduplication engine 255, in which a number of write requests 259 are processed. The data deduplication engine 255 may be structurally one complete module or may be associated and/or incorporated within other individual modules. Data deduplication engine 255 is configured for performing, in conjunction with other components of storage controller 240 such as microprocessor 242, data deduplication operations on write data passed through storage controller 240 to storage 230.

As previously indicated, storage controller 240 includes cache 245 (or what may be termed holistically as cache system) 245 accepts write data from hosts 210, 220, and 225, or similar devices, that is then placed in cache memory 245. Data deduplication engine 255 then tests the write data for duplication in the cache memory 245. The write requests 259 that the application 17 (FIG. 1) desires to protect from deduplication operations are designated with indicators 257 as shown. Please note that the indicator is "set" in the write command, and not in the data to be written (i.e., the write command payload). Those of the write requests 259 having indicator 257 that are passed through the data deduplication engine 255 designate to the data deduplication engine 255 that they are not subject to a deduplication operation.

In one embodiment, the application 17/file system 19 first determines whether a given data block must be stored multiple times on physical storage. This may be Superblock metadata associated with the file system 19 itself. The application 17 then may initiate a write request 259 to the underlying disk (device) driver, with the indicator 257 set (such as a high bit), designating that this data block must not be deduplicated, even if the block is determined to be identical to a previously written data block.

In a following step, the disk driver in turn prepares a command, such as a Small Computer Systems Interface (SCSI) command with the set bit to indicate "skip deduplication" to the storage controller 240. On receiving the designated data block, the storage controller 240, via data deduplication engine 255, skips the deduplication steps of fingerprint generation, matching, etc., as one of ordinary skill in the art will appreciate, and directly writes the selected data block onto a new physical disk location, even if there may have been earlier instances of identical data being stored on the storage controller 240.

In one embodiment, for applications executing at the user level, the writesystem call may be provided with an extended attribute indicating that a data block must be written to physical disk even if its contents match data written to disk earlier. If this is the case, additional steps are performed in similar fashion to that previously described depending on whether the write was to a block or a file interface, for example.

Turning now to FIG. 3, an embodiment of an input/output request, specifically a time-based write command 300 that may be sent from the host 210 (FIG. 2) to the storage controller 240. In one embodiment, the write request 300 is a SCSI command. FIG. 3 identifies each bit included in the 32 bytes of a command block. For example, in byte 0, an operation code identifies the type of command to be performed, i.e., a time-based write command. Bytes 2-9 are for the Logical Block Address (LBA) that identifies a first unit of data. Bytes 10-13 are for the transfer length, which indicates the number of blocks that are being written beginning with the first unit of data, and so on. One of ordinary skill in the art will appreciate that the various fields and/or various applicability of these fields in the write request 300 may vary according to a particular implementation.

In the illustrated embodiment shown in FIG. 3, the indicator 257 is shown making up bit 7 of byte 1 of the write command 300. In this manner, the indicator 257 may be a low (i.e., 0) or high (i.e., 1) bit to indicate that the designated data to be written is not subject to a data deduplication operation performed by data deduplication engine 255 (again, FIG. 2). Here again, those of ordinary skill in the art will appreciate that other similar indicators may be applied to the write request, or provided in conjunction with the write request and/or write data, to designate particular portions of data to be exempt from deduplication.

Figure 4:
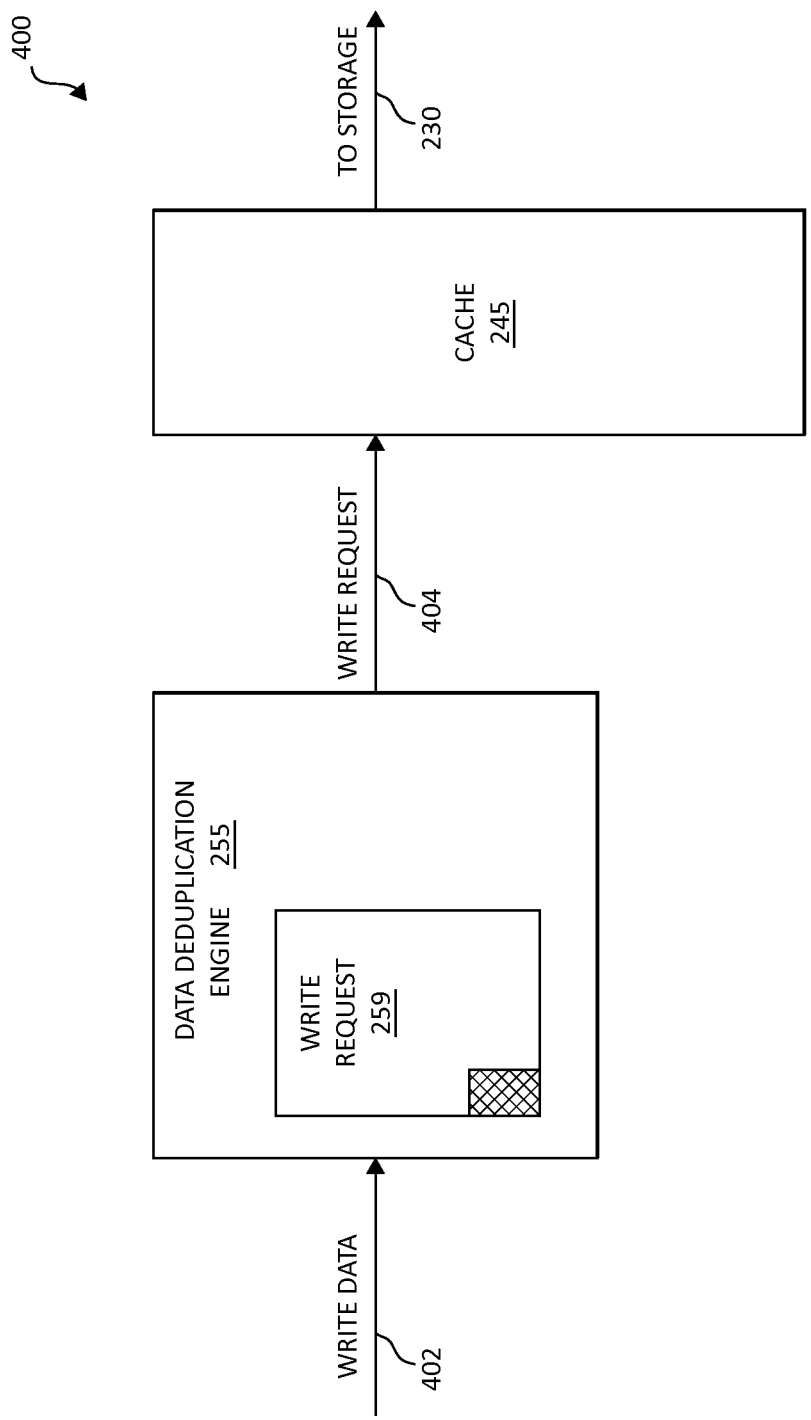
FIG. 4 is a block diagram of an exemplary process of writing data through a data deduplication engine, again in which aspects of the present invention may be implemented.

Turning now to FIG. 4, a block diagram of various functional aspects of the present invention are depicted as an exemplary flow. Specifically, cache system 245 is shown to accept write data 402 to be processed through data deduplication engine 255 as a write operation 404 to cache 245. As the write data 402 is processed through the data deduplication engine 255, and as previously described, the write data 402 is normally tested for duplication with existing storage. However, since the write request 259 contains indicator 257, no deduplication operation is performed, and the write data passes through the deduplication engine 255 through the cache system 245 and ultimately to physically allocated storage 230.

In an alternative embodiment, which is not shown for purposes of illustrative convenience, the cache system 245 may be placed in front of the deduplication engine 255. In such cases, if the indicator 257 is set in the write command 259, the corresponding data segment is written through the cache 245. Alternatively, the cache 245 stores the bit indicator 257 such that when the segment is later flushed, the indicator 257 for a given set of segments is available to the deduplication engine 255. One of ordinary skill in the art will appreciate that other modifications to the functional aspects depicted in FIG. 4 such as operational flow and placement as previously indicated may be performed to suit a particular application.

FIG. 5, following, is an exemplary method 500 for ensuring data redundancy in storage subsystems having data deduplication systems, in which aspects of the illustrated embodiments may be implemented. Method 500 begins (step 502) with the configuration of an indicator to be provided with a selected data segment (i.e., such as incorporated into a SCSI write request) to be written through the data deduplication system to designate that the selected data segment must not be subject to a deduplication operation (step 504). The method 500 then ends (step 506).

In FIG. 6, following, an exemplary method 600 for data processing is illustrated, here again in which various aspects of the present invention may be implemented. Method 600 begins (step 602), with the configuration of the indicator as previously described (step 604). In the illustrated embodiment, the indicator is provided in the context of a write request as a set bit in an SCSI write command (step 606). The command is then processed (step 608) by the storage controller. If the SCSI command includes a set bit for particular selected data (step 610), then a deduplication operation is withheld from being performed on the associated data segment (step 612), and correspondingly, the associated data segment is directly written to a newly allocated physical storage location (step 614).

Returning to step 610, if the SCSI command does not include the set bit for the particular selected data segment, then the associated data segment is processed through various deduplication algorithms in the deduplication engine (such as being checked for deduplication in other versions of the data segment that were previously stored, and performing other deduplication functionality that would be apparent to those of ordinary skill in the art. The method 600 then ends (step 618).

The mechanisms of the illustrated embodiments may be applicable to write requests themselves as previously described, or, in other embodiments, be implemented in the context of the selected data itself. For example, in one embodiment, the Superblock metadata itself may be flagged with the indicator to designate the information as not subject to data deduplication operations. Other techniques for providing an indication in conjunction with selected data may be apparent to those of ordinary skill in the art as appropriate for a specific application.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "process" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, or entirely on the remote computer or server. In the last scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for preserving data redundancy in a data deduplication system in a computing environment by a processor, comprising:

receiving a write command for writing a selected data segment to a physical storage location, wherein the selected data segment is at least one of a Superblock and file system metadata required to be stored repetitively on physical storage;

determining whether the write command includes an indicator including at least one of a bit and a flag, the indicator designating that the selected data segment must not be subject to a deduplication operation;

if the write command does not include the indicator, generating a fingerprint for the selected data segment and performing a deduplication operation on the selected data segment; and if the write command does include the indicator, bypassing the generating the fingerprint and the performing the deduplication operation;

wherein configuring an indicator further includes, for an application operational in the computing environment, providing a system call with an extended attribute indicating that the selected data segment must be written to physical memory notwithstanding the selected data segment matching data written to the physical memory earlier in time.

2. The method of claim 1, further including processing the indicator such that the deduplication operation is withheld from being performed on the selected data segment.

3. The method of claim 2, wherein processing the indicator includes preparing the write command, and incorporating the indicator into the write command to be provided to a storage controller in the computing environment.

4. The method of claim 3, wherein processing the indicator includes:

receiving the write command by the storage controller, and directly writing the selected data segment to a new physical storage location.

* * * * *